US007051705B2

(12) United States Patent
Doering

(10) Patent No.: US 7,051,705 B2

(45) Date of Patent: May 30, 2006

(54) CONTROL SYSTEM PARAMETER MONITOR

(75) Inventor: Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 10/709,742

(22) Filed: May 26, 2004

(65) Prior Publication Data

US 2004/0204813 A1 Oct. 14, 2004

Related U.S. Application Data

(62) Division of application No. 10/065,685, filed on Nov. 8, 2002.

(51) Int. Cl.
*F02D 45/00* (2006.01)
*G01M 19/00* (2006.01)

(52) U.S. Cl. ...................... 123/350; 123/436; 123/399; 701/110

(58) Field of Classification Search ................ 123/350, 123/436, 399, 406.23; 701/110
See application file for complete search history.

(56) References Cited

U.S. PATENT DOCUMENTS 4,575,800 A 3/1986 Kittelson
4,644,474 A 2/1987 Aposchanski et al.
4,893,244 A 1/1990 Tang et al.
5,581,465 A * 12/1996 Adler et al. ................ 701/110
5,635,634 A 6/1997 Reuschenbach et al.
5,889,204 A 3/1999 Scherer et al.
6,065,446 A * 5/2000 Engl et al. .................. 123/325
6,295,967 B1 * 10/2001 Weber et al. ............... 123/399
6,328,007 B1 12/2001 Hirawawa et al.
6,397,152 B1 * 5/2002 Kalweit et al. ............... 702/41
6,718,255 B1 * 4/2004 Okubo ....................... 701/110
6,820,588 B1 * 11/2004 Happenhofer et al. ...... 123/299
6,883,493 B1 * 4/2005 Matischok et al. ......... 123/325
6,886,530 B1 * 5/2005 Matischok et al. ......... 123/395
6,968,826 B1 * 11/2005 Doering ................... 123/406.2
2004/0089267 A1 * 5/2004 Doering ................. 123/406.23
2004/0257016 A1 * 12/2004 Biester et al. .............. 318/432
2005/0182546 A1 * 8/2005 Hsieh et al. .................. 701/54

* cited by examiner

*Primary Examiner*—Hai Huynh
(74) *Attorney, Agent, or Firm*—Julia Voutyras; Bir Law, PLC

(57) ABSTRACT

A control system parameter monitor determines a difference between a desired and estimated or measured parameter value, applies a weighting factor to the difference, and selects a control strategy based on the weighted difference. The weighting factor generally reflects the confidence in the accuracy of the parameter value determined by the parameter monitor. The weighting factor may be determined based on one or more engine or ambient operating conditions or parameters, or based on statistical analyses of monitor values and/or control system parameter values, for example. In one embodiment, an engine torque monitor for an electronic throttle control system uses percent torque deviation and rate of change to select an appropriate weighting factor and determine whether a deviation between desired and estimated or measured torque selects an alternative control strategy.

20 Claims, 6 Drawing Sheets

| | Small Difference | Medium Difference | Large Difference |
|---|---|---|---|
| Small Delta rate of change | Zero weight (0.0) | Small weight (0.2) | Medium weight (0.7) |
| Medium Delta rate of change | Zero weight (0.0) | Medium weight (0.7) | Large weight (1.0) |
| Large Delta rate of change | Small weight (0.2) | Large weight (1.0) | Large weight (1.0) |

CONTROL SYSTEM PARAMETER MONITOR

CROSS REFERENCE TO RELATED APPLICATIONS

This application is a divisional of U.S. Ser. No. 10/065,685 filed Nov. 8, 2002, the disclosure of which is incorporated by reference in its entirety.

BACKGROUND OF INVENTION

1. Field of the Invention

The present invention relates to a system and method for monitoring a control system parameter.

2. Background Art

A number of strategies for detection and diagnosis of anomalous or irregular operation of the control computer or system sensors and/or actuators have been developed. One approach to detect anomalous operation uses a monitor to provide an alternative determination (preferably independently) of a parameter value, acceptable range, minimum, or maximum based on current operating conditions. If the parameter value determined by the control system is outside of the acceptable range or differs significantly from that determined by the monitor, the system might provide a warning and/or initiate an alternative control strategy, for example. However, initiating an alternative control strategy may adversely impact system performance. As such, it is desirable to provide detection of anomalous operation without any incorrect or false detection that may adversely impact system operation, to avoid any decrease in performance that might otherwise lead to customer complaints and associated warranty costs.

One application for a parameter monitor is in controlling a vehicle and/or vehicle systems and subsystems, such as an internal combustion engine. For example, engines having an electronic throttle control (ETC) system have no mechanical link between the accelerator pedal operated by the driver, and the throttle, which generally controls engine output power. These systems may use a parameter monitor to detect anomalous operation of the throttle control system. In an effort to detect every occurrence of certain anomalous conditions, the present inventor has recognized that the parameter monitor may incorrectly trigger alternative control strategies in response to deviations of one or more system components or models, for example, which are within the expected tolerance of those elements.

SUMMARY OF INVENTION

The present invention provides a system and method for monitoring a control system parameter that accurately detect anomalous operating conditions while accommodating expected deviations in parameter values associated with system component tolerances, which may include sensor measurement deviations or modeling deviations, for example.

Embodiments of the present invention include a system and method for monitoring a control system parameter of a multiple-cylinder internal combustion engine to detect anomalous or uncharacteristic operation. One embodiment includes a system and method for monitoring output of a vehicle powertrain including an engine having an electronic throttle control system that determine a difference between a desired and estimated or measured parameter value, apply a weighting factor to the difference, and select a control strategy based on the weighted difference. The weighting factor generally reflects the confidence in the accuracy of the parameter value determined by the parameter monitor. The weighting factor may be determined based on one or more engine or ambient operating conditions or parameters, and/or based on statistical analysis of monitor values or control system parameter values, for example. In one embodiment, an engine torque monitor uses percent torque deviation and rate of change to select an appropriate weighting factor.

The present invention provides a number of advantages. For example, the present invention provides a more robust torque monitor by using a weighting factor to attenuate deviations attributable to sources that do not call for alternative control strategies or intervention. In addition, the invention does not significantly impact the response time to detect anomalous or uncharacteristic operation that may indicate a sudden degradation in component or system operation.

The above advantages and other advantages, objects, and features of the present invention will be readily apparent from the following detailed description of the preferred embodiments when taken in connection with the accompanying drawings.

DETAILED DESCRIPTION

Figure 1:
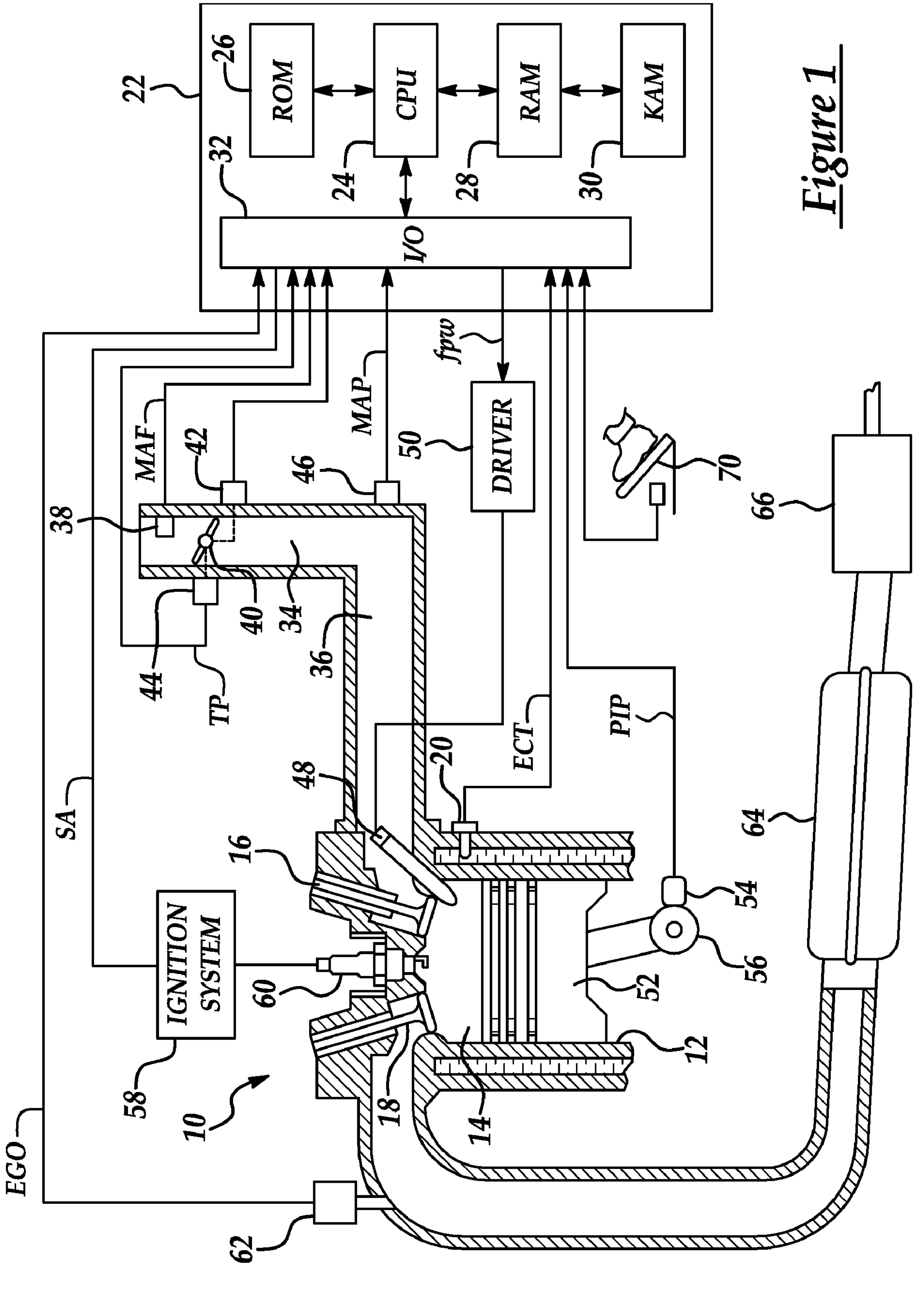
FIG. 1 is a block diagram of a representative application for a control system parameter monitor according to one embodiment of the present invention.

The present invention relates to a control system parameter monitor that attempts to accurately determine whether the control system is functioning normally. The present invention provides a robust parameter monitor that can be designed, adjusted, calibrated, or tuned using a weighting factor or function to improve immunity to noise or other deviations attributable to various system components or elements, such as physical sensors or actuators, or models used to calculate or estimate operating conditions, ambient conditions, or associated variables, for example. The representative embodiments used to illustrate and describe the invention relate generally to a vehicle control system, and more particularly to a torque monitor for an engine control system having an electronic throttle control (ETC). Of course, the present invention is independent of the particular control system parameter being monitored, the particular type of control system being used, and the particular type of device, application, or process being controlled. Those of ordinary skill in the art will recognize a variety of other applications for control system parameter monitors based on the representative embodiments described and illustrated herein. As such, while the torque monitor of the present invention is described with reference to a spark-ignited, direct or port injection internal combustion engine having electronic throttle control and conventional cam timing, the invention is independent of the particular engine technology and may be used in a wide variety of vehicle, engine, and numerous other applications to provide a robust control system parameter monitor.

System 10 includes an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators that operate intake valves 16 and exhaust valves 18. However, the engine may include only a single engine coolant temperature sensor 20.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known temporary and/or persistent memory devices such as PROMs, EPROMs, EEPROMs, flash memory, or any other electric, magnetic, or optical memory capable of storing data, code, instructions, calibration information, operating variables, and the like used by microprocessor 24 in controlling the engine. Microprocessor 24 communicates with the various sensors and actuators via an input/output (I/O) interface 32.

In operation, air passes through intake 34 where it may be distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 is used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or torque requested by an operator via accelerator pedal 70. A throttle position sensor 44 provides a feedback signal (TP) to controller 22 indicative of the actual position of throttle valve 40 to implement closed loop control of throttle valve 40.

A manifold absolute pressure sensor 46 is used to provide a signal (MAP) indicative of the manifold pressure to controller 22. Air passing through intake manifold 36 enters combustion chamber 14 through appropriate control of one or more intake valves 16. For variable cam timing applications, intake valves 16 and exhaust valves 18 may be controlled directly or indirectly by controller 22 using electromagnetic actuators or a variable cam timing (VCT) device. Alternatively, intake valves 16 and exhaust valves 18 may be controlled using a conventional camshaft arrangement. A fuel injector 48 injects an appropriate quantity of fuel in one or more injection events for the current operating mode based on a signal (FPW) generated by controller 22 and processed by driver 50.

As illustrated in FIG. 1, fuel injector 48 injects an appropriate quantity of fuel in one or more injections into the intake port or directly into combustion chamber 14. Control of the fuel injection events is generally based on the position of piston 52 within cylinder 12. Position information is acquired by an appropriate sensor 54, which provides a position signal (PIP) indicative of rotational position of crankshaft 56.

At the appropriate time during the combustion cycle, controller 22 generates a spark signal (SA) which is processed by ignition system 58 to control spark plug 60 and initiate combustion within chamber 14. Controller 22 (or a conventional camshaft) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the air/fuel ratio, or control the operating mode of one or more cylinders, for example. The exhaust gas is passed through the exhaust manifold and one or more catalysts 64, 66 before being exhausted to atmosphere.

Controller 22 includes software and/or hardware control logic to monitor one or more control system parameters according to the present invention. In one embodiment, controller 22 monitors an engine or powertrain torque parameter used by the electronic throttle control (ETC) system. The torque parameter may represent a desired engine indicated torque or brake torque, or a desired powertrain output torque, for example. In one preferred embodiment, controller 22 determines a desired engine brake torque used in controlling the ETC system. An engine torque monitor independently determines the actual engine brake torque. Depending upon the particular application, the actual engine brake torque may be measured using a corresponding sensor, or may be estimated or calculated using various engine and ambient operating parameters. Control logic implemented by controller 22 then determines a difference between the desired and actual engine brake torque. A weighting factor, preferably stored in a three-dimensional lookup table is then retrieved based on current engine and/or ambient operating conditions or parameters and applied to the difference to generate a weighted difference. In one preferred embodiment, the weighting factor is accessed or retrieved based on a ratio or percentage difference of the desired and actual values and a delta rate of change of the difference. For example, the percentage difference may be determined according to:

$$\%\ \text{difference}=100*((\text{actual}/\text{requested})-1)$$

where actual represents the measured or estimated actual parameter value generated by the monitor, in this example the estimated actual engine indicated torque, and requested represents the requested or desired value generated by or for the control system (for other purposes the brake torque could also be used). The delta rate of change of the difference in parameter values may be determined using the difference between the actual and requested or desired value at a current time t and a previous time t-1 according to:

$$\text{delta rate of change}=(\text{difference}_t\ \text{difference}_{t-1})/\Delta t$$

where Δt represents the difference in time between the current and previous times. Of course, other system inputs, parameters, or variables may be used to access a lookup table to retrieve a weighting factor, or used in a weighting factor function to generate an appropriate weighting factor depending upon the particular application. The system inputs, parameters, or variables are preferably selected such that the resulting weighting factor attenuates noise or expected deviations within an acceptable tolerance range for various system elements or components while allowing anomalous or uncharacteristic operation of one or more elements or components to be quickly detected.

Figures 2, 4:
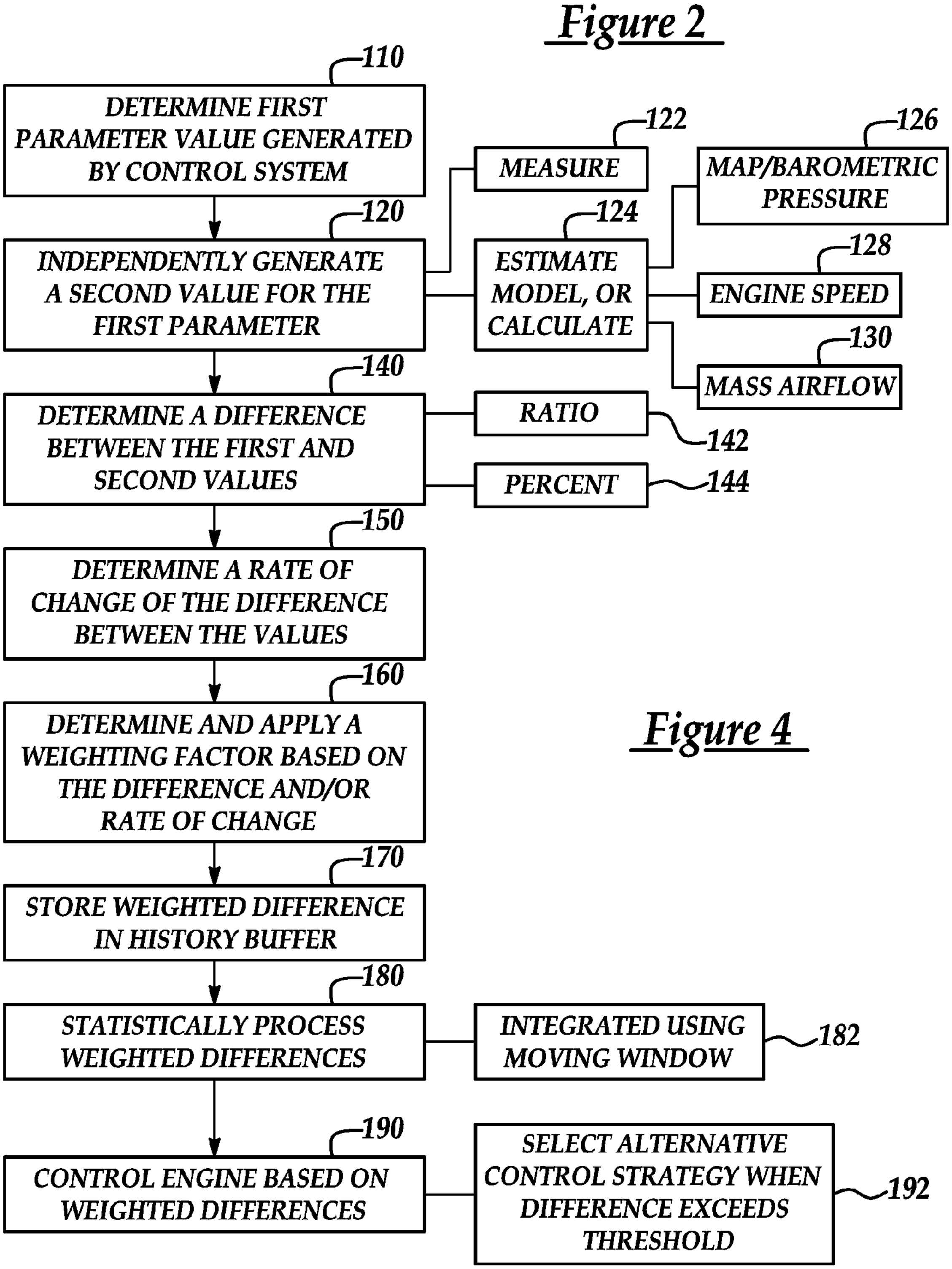
FIG. 2 illustrates a representative fuzzy logic implementation for determining a weighting factor for a parameter monitor according to one embodiment of the present invention.
FIG. 4 is a flow diagram illustrating operation of a system or method for monitoring a control system parameter according to one embodiment of the present invention.

As illustrated in the table of FIG. 2, one embodiment of the present invention uses fuzzy logic techniques to classify or categorize the input parameters used to determine a weighting factor. The percentage difference and delta rate of change are classified as being small, medium, or large based on the particular application and/or current operating conditions. A corresponding weighting factor magnitude of zero, small, medium, or large is then selected from a three-dimensional look-up table stored in memory accessed or indexed by the parameter difference and rate of change with the table entries representing the retrieved weighting factor applied to the parameter difference. Representative numerical values are illustrated with associated relative magnitudes for an exemplary application. Additional categories or classifications for the fuzzy logic input parameters and relative magnitudes for the weighting factor may be provided depending upon the particular application. Likewise, traditional look-up tables or functions may be used in addition to, or in place of a fuzzy logic implementation.

Figure 3:
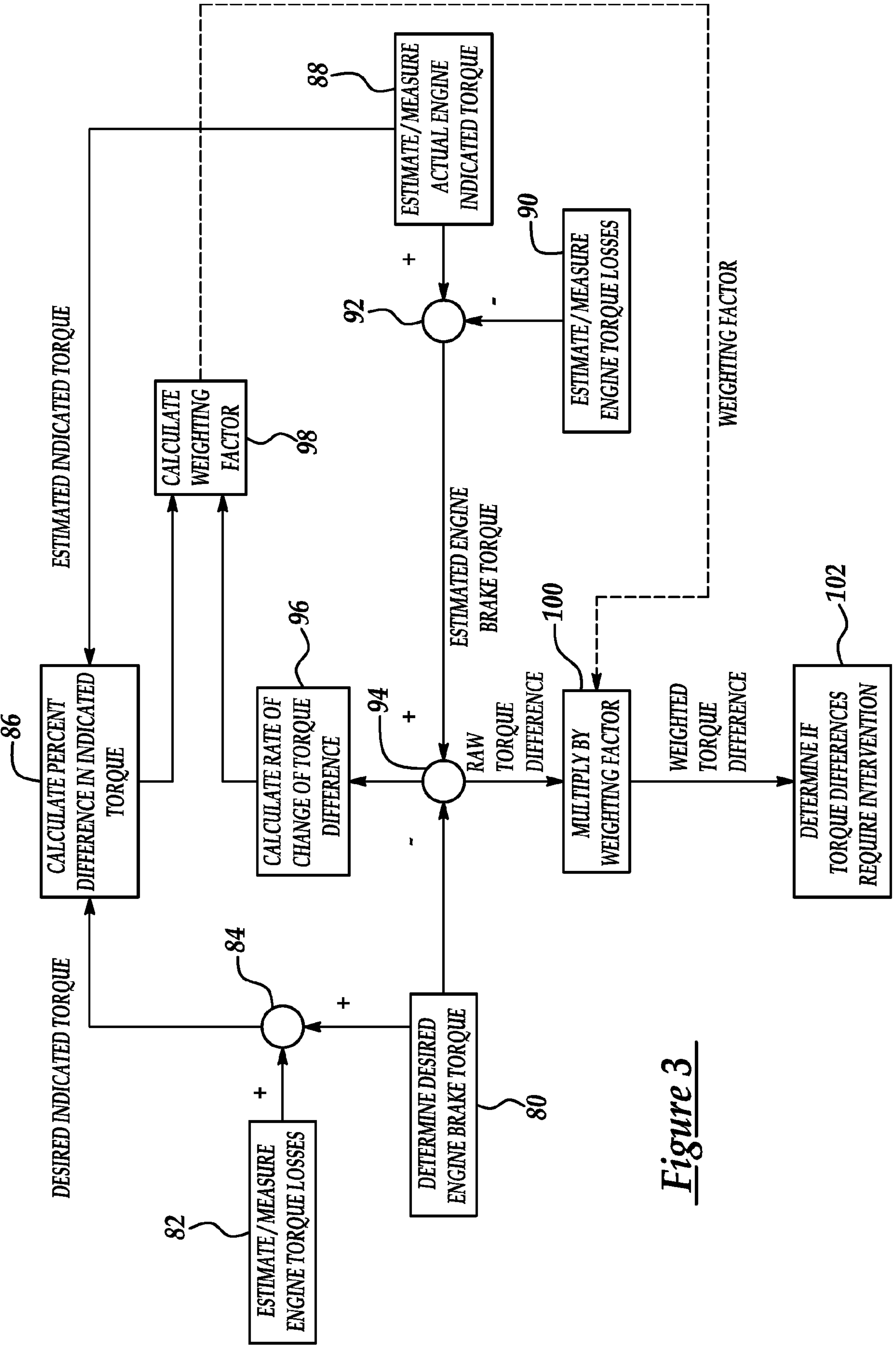
FIG. 3 is a block diagram illustrating torque monitor with weighting factor according to one embodiment of the present invention.

Block diagrams illustrating operation of representative embodiments of a system and method for monitoring a control system parameter according to the present invention are shown in FIGS. 3 and 4. The diagrams of FIGS. 3 and 4 represent control logic for one embodiment of a control system parameter monitor according to the present invention. As will be appreciated by one of ordinary skill in the art, the diagrams of FIGS. 3 and 4 may represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the objects, features, and advantages of the invention, but is provided for ease of illustration and description. Preferably, the control logic is implemented in software executed by a microprocessor-based vehicle, engine, and/or powertrain controller, such as controller 22 (FIG. 1). Of course, the control logic may be implemented in software, hardware, or a combination of software and hardware depending upon the particular application. When implemented in software, the control logic is preferably provided in one or more computer-readable storage media having stored data representing code or instructions executed by a computer to control the engine. The computer-readable storage medium may be any of a number of known physical devices which utilize electric, magnetic, and/or optical storage to keep executable instructions and associated calibration information, operating variables, and the like.

As illustrated in FIG. 3, a desired or requested engine brake torque is determined as represented by block 80. Estimated or measured engine torque losses are then added at block 84 to determine a requested or desired indicated torque. The difference between the desired indicated torque determined by the control system and the estimated or measured indicated torque determined by the parameter monitor is used by block 86 to calculate a percent difference in indicated torque. The estimated, calculated, or measured actual engine indicated torque represented by block 88 is also used by the parameter monitor to independently determine an estimated engine brake torque by subtracting estimated and/or measured engine torque losses as determined by the parameter monitor at block 90 at block 92.

The desired engine brake torque determined by block 80 is subtracted from the estimated engine brake torque generated by block 92 at block 94 to determine a raw torque difference. The raw torque difference is used to calculate a rate of change of torque difference at block 96 based on the torque difference for current and previous times as described above. The rate of change of torque difference determined at block 96 is used in combination with the percent difference determined in block 86 to generate or retrieve a weighting factor as represented by block 98. The weighting factor determined by block 98 is then applied to the raw torque difference determined at block 94 as represented by block 100. One or more weighted torque differences may be used to determine whether an alternative control strategy or other intervention is required as represented by block 102. As described in greater detail below, the torque differences may be temporarily stored in a history buffer and used to compute a moving window integration, for example.

The block diagram/flowchart of FIG. 4 provides an alternative representation illustrating operation of a system or method for monitoring a control system parameter according to the present invention. A first control system parameter value is determined as represented by block 110. A second value for the first parameter is preferably independently generated as represented by block 120. The second value, generated by the monitor, is used to provide an independent plausibility check for the parameter values generated by the control system. The independent plausibility checker may generate a value for the monitored parameter using one or more measured or sensed operating conditions, ambient conditions, or parameters as represented by block 122. Alternatively, or in combination, a second value for the first parameter may be estimated, calculated, or generated by a corresponding model as represented by block 124. The estimate, model, or calculation may incorporate one or more estimated quantities and/or measured quantities that may be determined using corresponding sensors as generally represented by MAP sensor/barometric pressure sensor 126, engine speed sensor 128, and mass air flow sensor 130. Various other sensors or models may provide indications for engine coolant temperature, cylinder head temperature, intake air temperature, accessory pressures/loads, etc. Although not explicitly illustrated in FIG. 4, the sensors may also be used to provide a direct measurement used to determine the second value for the first parameter depending upon the particular application.

The difference between the first and second values generated by the control system and the monitor, respectively, is then determined as represented by block 140. The difference may be represented using a ratio 142 or a percentage difference 144 as described in greater detail above. Of course, various other methods may be used to characterize the relative magnitude of the difference rather than a mathematical computation, such as using a look-up table or function to assign a relative magnitude based on the difference value.

In the embodiment illustrated in FIG. 4, the rate of change of the difference between the values is determined as represented by block 150. The difference between the first and second values and/or the rate of change of the difference between the values may be used to determine an appropriate weighting factor, which is then applied to the difference as represented by block 160. Representative relative weighting factors and associated numerical values for one embodiment are illustrated and described with reference to FIG. 2. The weighted difference may then be stored in a history buffer as represented by block 170 for subsequent statistical processing as represented by block 180. In one embodiment, the stored weighted difference values are integrated using a moving window or sliding integration or sum of a predetermined number of values as represented by block 182. For example, the history buffer may store thirty previous weighted difference values to provide a suitable number for use in the integration. Various other statistical calculations may be performed using the values stored in the history buffer. For example, a moving average, standard deviation, max/min, etc. may be determined.

The engine is then controlled based on one or more weighted differences as represented by block 190. For example, an alternative control strategy may be selected when a weighted difference, or a sum of weighted differences, exceeds a corresponding threshold as represented by block 192. The threshold is preferably selected to distinguish between anomalous or uncharacteristic operation and differences attributable or associated with measurement variation, modeling error, or the like.

Figure 5A:
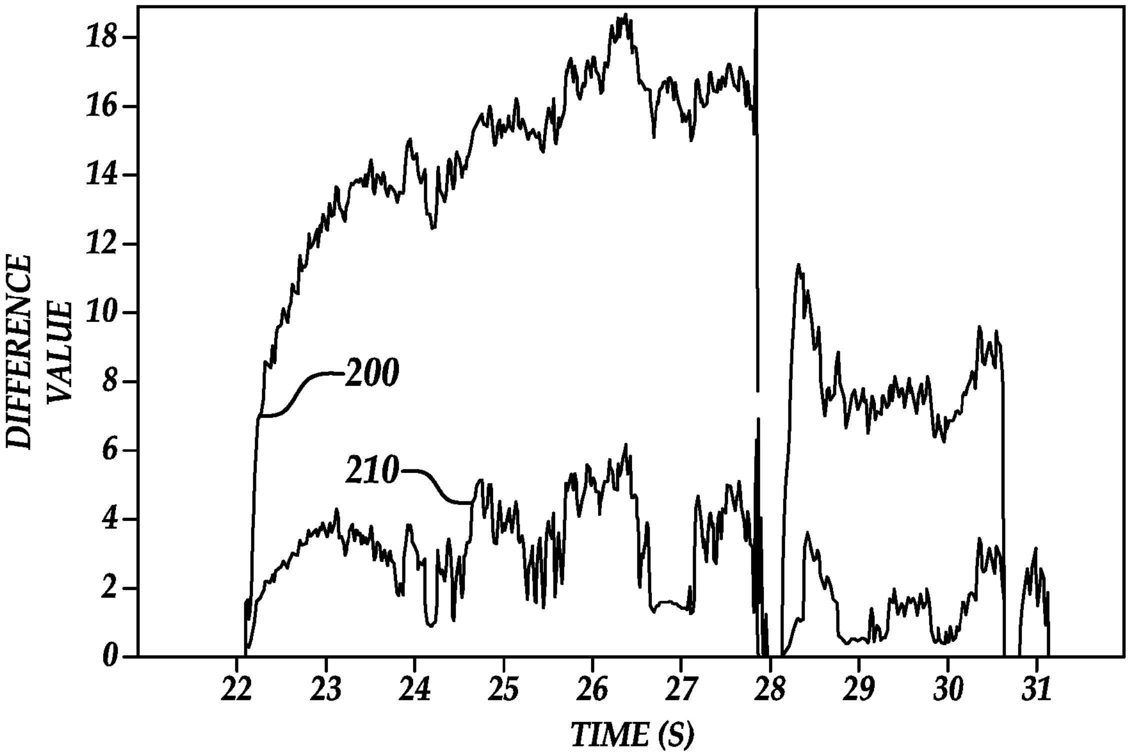
FIGS. 5A and 5B illustrate improvement of performance in response to a simulated parameter measurement inaccuracy for one embodiment of a torque monitor with a weighting factor according to the present invention.
Figure 5B:
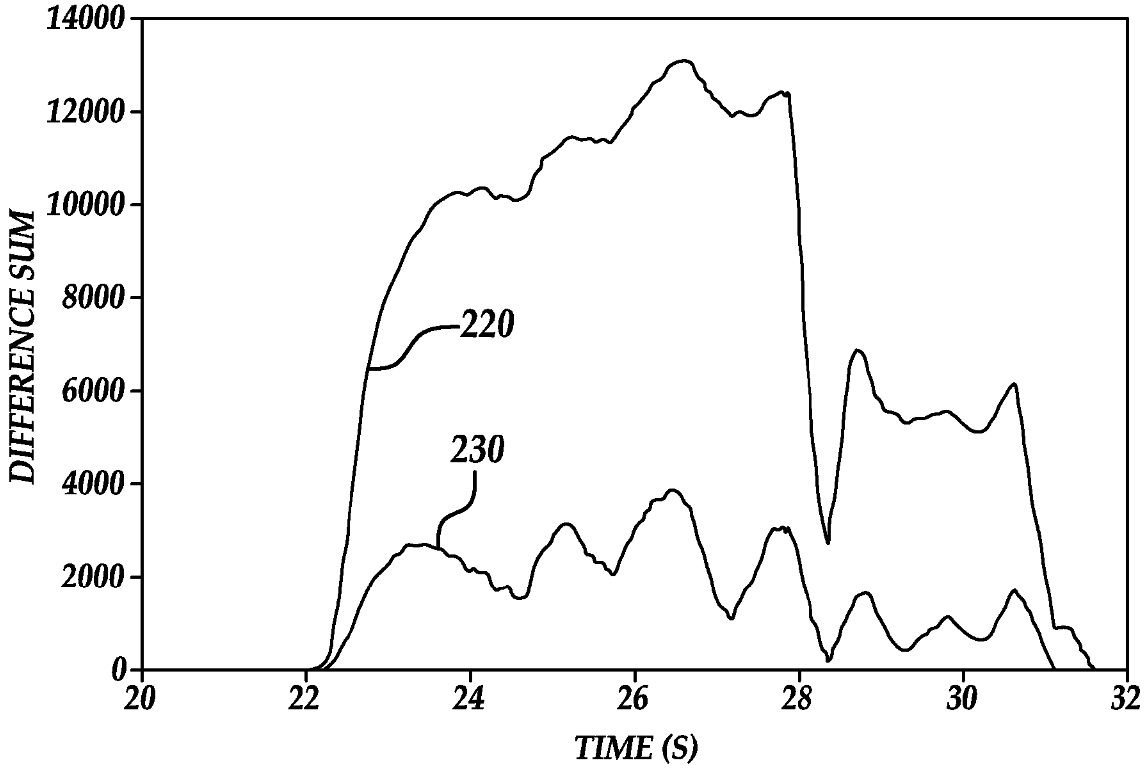

FIGS. 5A and 5B illustrate performance of a system or method for monitoring a control system torque parameter according to one embodiment of the present invention in response to a simulated parameter measurement inaccuracy. FIG. 5A illustrates a raw difference value 200 as a function of time in addition to the corresponding weighted difference value 210 as a function of time in seconds. As also shown in FIG. 5A, the weighting factor of the present invention significantly attenuates differences between the parameter values calculated by the control system and the monitor, in effect improving the noise rejection or signal to noise ratio of the monitor. The simulated measurement inaccuracy corresponds to a mass airflow sensor transfer function that is 15 percent higher than nominal. FIG. 5B illustrates the difference sum or moving window integration of the differences corresponding to the raw differences represented in FIG. 5A. Line 220 represents the moving window sum of the raw difference values 200 while line 230 represents the moving window sum of the weighted difference values 210. As such, these figures clearly show how dramatically the present invention can attenuate measurement deviations or excursions attributable to a system component or sensor for a torque monitor application.

Figure 6A:
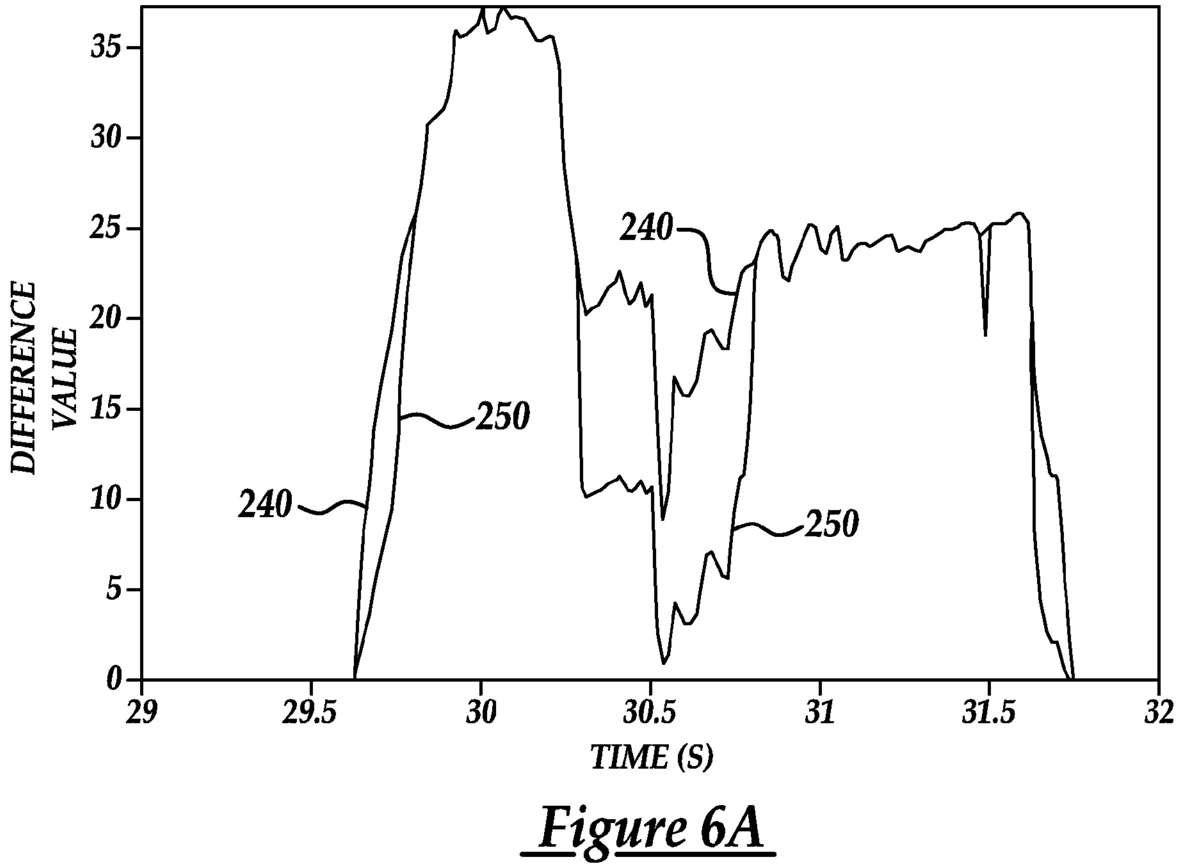
FIGS. 6A and 6B illustrate improvement of performance in response to a first simulated anomalous condition for the embodiment of a torque monitor illustrated in FIGS. 5A and 5B.
Figure 6B:
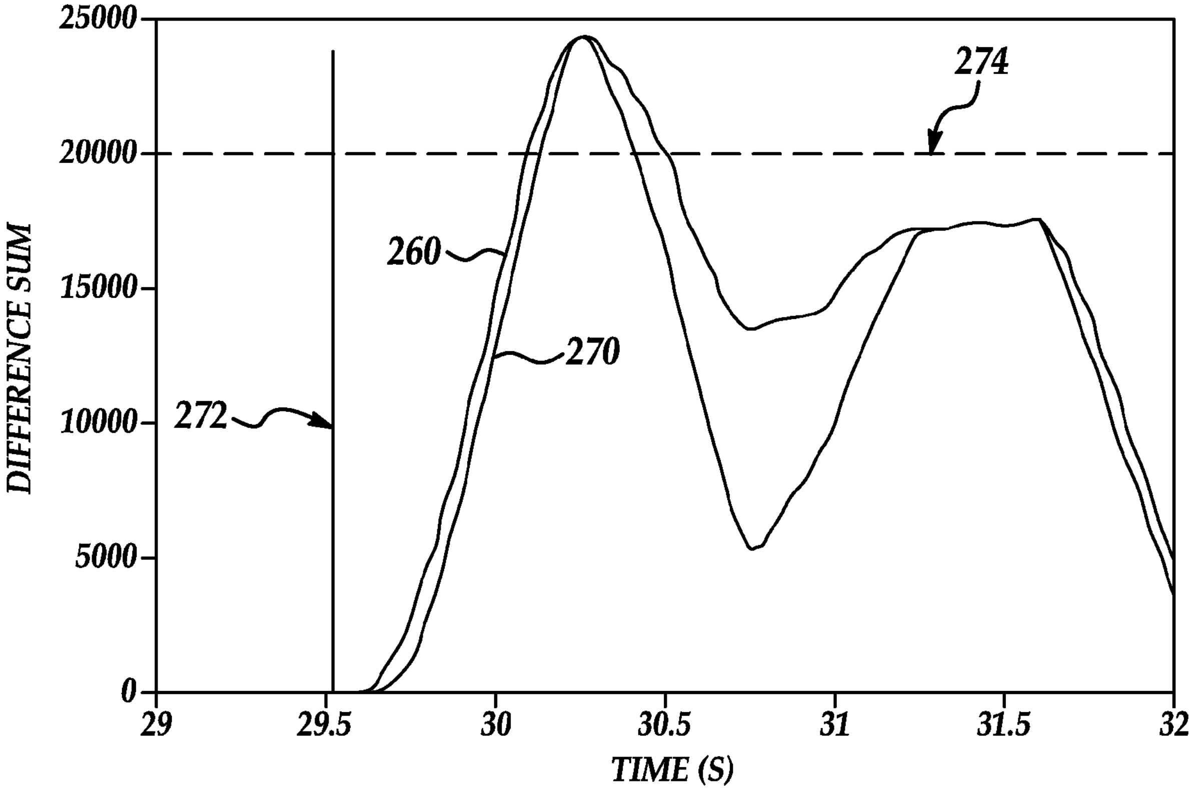

FIGS. 6A and 6B illustrate performance of the embodiment of FIGS. 5A and 5B in response to a first simulated anomalous condition. Line 240 of FIG. 6A represents the raw difference values while line 250 represents the weighted difference values. Line 260 of FIG. 6B corresponds to a moving window integration or sum of raw difference values 240 (FIG. 6A) while line 270 represents a moving window integration of the weighted difference values 250 (FIG. 6A). An anomalous or uncharacteristic condition occurs at 29.5 seconds as represented by line 272. As illustrated, the integration of the weighted differences 270 slightly lags, but closely tracks the corresponding integration of unweighted difference values 260. Both exceed a corresponding threshold 274 that triggers an alternative control strategy or other intervention. Although the uncharacteristic condition occurring at line 272 causes the integration of the unweighted difference values to exceed the corresponding threshold 274 by only a small amount, the sum of the weighted differences also exceeds threshold 274 and triggers the alternative control strategy with a response time lagging by only a few milliseconds, which would be acceptable for most applications. To adjust or tune the response to reduce response time, or to distinguish between degradation and measurement deviation of a particular component, the weighting factor or function can be adjusted accordingly.

Figure 7A:
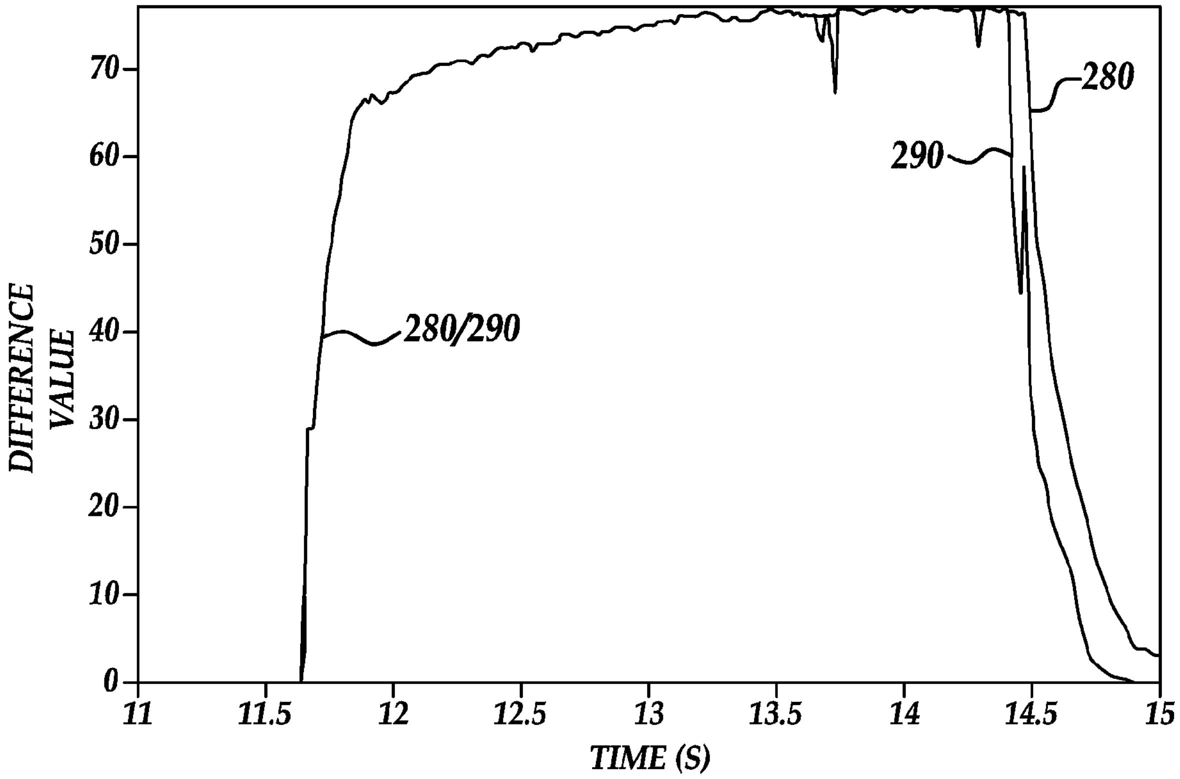
FIGS. 7A and 7B illustrate improvement of performance in response to a second simulated anomalous condition f or the embodiment illustrated in FIGS. 5A and 5B.
Figure 7B:
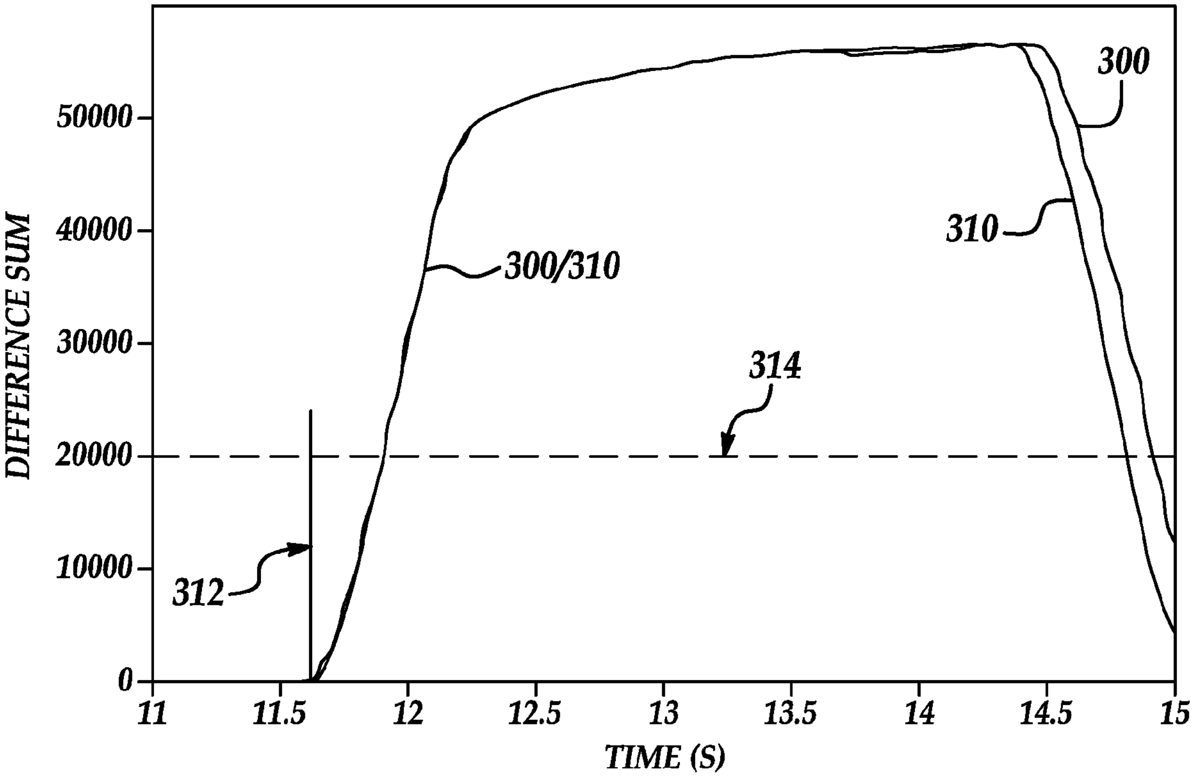

FIGS. 7A and 7B illustrate performance of a representative embodiment of a control system parameter in response to a second simulated anomalous condition. The raw difference between the first and second parameter values is represented by line 280, which is substantially coincident with the weighted difference as represented by line 290 until about 14.4 seconds. Likewise, the integrated raw difference line 300 is substantially coincident with the integrated weighted difference line 310 until about 14.4 seconds. The anomalous condition occurs at about 11.7 seconds as represented by line 312. The sum of the differences corresponding to both the raw difference 300 and the weighted difference 310 exceeds threshold 314 at virtually the same time of 11.9 seconds, triggering an alternative control strategy or other intervention. As shown in FIG. 7B, the simulated anomalous condition results in an difference sum that greatly exceeds threshold 314. As such, FIGS. 7A and 7B demonstrate that the present invention also performs well for such anomalous conditions with no noticeable effect on the resulting response time.

While the best mode for carrying out the invention has been described in detail, those familiar with the art to which this invention relates will recognize various alternative designs and embodiments for practicing the invention as defined by the following claims.

The invention claimed is:

1. A system for controlling a multiple cylinder internal combustion engine, the system comprising:

a feedback controller for controlling an output parameter to reduce a difference between a first desired output parameter value and an actual output parameter value; and a control system monitor for generating a second desired output parameter value, determining a difference between the first desired output parameter value generated by the feedback controller and the second desired output parameter value determined by the control system monitor, applying a weighting factor to the difference to generate a weighted difference, and controlling the engine based on the weighted difference.

2. The system of claim 1 wherein the first and second desired output parameter values represent engine torque.

3. The system of claim 1 wherein the control system monitor estimates the second desired output parameter value based on at least engine speed, barometric pressure, and mass airflow.

4. The system of claim 1 wherein the control system monitor determines a weighting factor based on the difference between the first and second desired output parameter values.

5. The system of claim 1 wherein the control system monitor determines a weighting factor based on a ratio of the first and second desired output parameter values.

6. The system of claim 1 wherein the control system monitor determines a weighting factor based on a rate of change of the difference between the first and second desired output parameter values.

7. The system of claim 1 wherein the control system monitor determines a weighting factor based on a ratio of the first and second parameter values and a rate of change of the difference between the first and second parameter values.

8. The system of claim 7 wherein the control system monitor integrates the weighted difference, and selects an alternative control strategy when the integrated weighted difference exceeds a corresponding threshold.

9. The system of claim 1 wherein the control system monitor determines the second desired output parameter value by estimating the second desired output parameter value based on inputs from a plurality of sensors.

10. The system of claim 9 wherein the first and second desired output parameter values represent engine brake torque and wherein the inputs from a plurality of sensors include a mass airflow input and a barometric pressure input.

11. The system of claim 10 wherein the barometric pressure input is generated by a manifold absolute pressure sensor.

12. The system of claim 10 wherein the control system monitor generates a barometric pressure input using an inference based on throttle position, engine speed, cam position and measured airflow.

13. The system of claim 1 wherein the control system monitor implements an alternative control strategy when a statistical calculation based on a history of the weighted difference exceeds a corresponding threshold.

14. A system for controlling a multiple cylinder internal combustion engine having an electronically controlled throttle valve to modulate intake air in response to a control system parameter, the system comprising:

a controller having control logic for determining a desired engine torque, determining an actual engine torque, determining a difference between the desired and actual engine torque, applying a weighting factor to the difference to generate a weighted difference, and selecting one of first and second engine control strategies based on the weighted difference.

15. The system of claim 14 further comprising:

at least one sensor for providing a sensor signal indicative of a current engine or ambient operating condition in communication with the controller, wherein the controller determines an actual engine torque by estimating actual engine torque based on the sensor signal.

16. The system of claim 15 wherein the at least one sensor comprises:

an engine speed sensor, a mass airflow sensor, and a pressure sensor in communication with the controller.

17. The system of claim 14 wherein the controller determines the actual engine torque using a monitor to measure engine brake torque.

18. The system of claim 14 wherein the controller retrieves the weighting factor from memory based on a percentage difference between the desired engine torque and actual engine torque and based on the rate of change of the difference.

19. The system of claim 18 wherein the desired engine torque and actual engine torque correspond to engine brake torque.

20. A computer readable storage medium having stored data representing instructions executable by a computer to control a multiple cylinder internal combustion engine having an electronic throttle control system, the computer readable storage medium comprising:

instructions for determining a desired engine torque parameter for use by the electronic throttle control system;

instructions for monitoring the desired engine torque parameter by determining an actual engine torque based on current engine and ambient operating parameters;

instructions for determining a difference between the desired and actual engine torque;

instructions for determining a weighting factor based on the difference and a rate of change of the difference;

instructions for applying the weighting factor to the difference between the desired and actual engine torque to determine a weighted difference; and instructions for controlling the engine in response to the weighted difference.

* * * * *